Patented Aug. 1, 1944

2,354,823

UNITED STATES PATENT OFFICE 2,354,823

PURIFICATION OF CAUSTIC SOLUTIONS

Irving E. Muskat and Fred D. Ayres, Akron, Ohio, assignors to Pittsburgh Plate Glass Company, Allegheny County, Pa., a corporation of Pennsylvania No Drawing. Application March 25, 1940, Serial No. 325,786

3 Claims. (Cl. 23—184)

This invention relates to the purification of aqueous solutions of alkali metal hydroxides and is particularly directed to the removal of silica therefrom. In the commercial preparation of sodium hydroxide solutions, particularly by the lime-soda process, it is often found that the solution is contaminated with a substantial amount of silica which renders the solutions objectionable for certain uses. Since silicon compounds are readily soluble in sodium hydroxide solutions, the removal of this impurity is found to be exceedingly difficult and until now, few satisfactory processes capable of removing this material to a suitable degree have been suggested.

In accordance with our invention, we have found that the silica content of aqueous solutions of alkali metal hydroxides may be reduced substantially by treatment with liquid ammonia whereby a purified concentrate may be secured. This invention is not limited to the use of anhydrous liquid ammonia since mixtures of ammonia and water which contain at least enough ammonia (in general, at least 65 percent), so as to insure the separation of two liquid phases, each containing a quantity of sodium hydroxide, ammonia and water, may be used.

Upon addition of liquid ammonia to an alkali metal hydroxide solution, which is contaminated with silica, the mixture separates into two liquid phases and if it is allowed to stand, stratifies to form a pair of layers. The upper layer contains a large part of the ammonia and a portion of the caustic and water. The lower layer contains the major portion of the sodium hydroxide and the remainder of the water and ammonia. We have found that upon treatment of a caustic solution containing silica, the silica tends to concentrate in the lower or heavier phase. Thus, upon removal of the upper layer and separation of the ammonia, purified caustic is obtained. Upon removal of the upper liquid layer and separation of the sodium hydroxide therefrom, sodium hydroxide which has an unusually low silica content is secured.

It has been found that desirable results may be secured by treating the solution with mixtures of liquid ammonia and water so long as sufficient ammonia is present to insure production of a pair of liquid phases. The distribution of the sodium hydroxide and water between the two liquid phases formed by means of the ammonia is dependent mainly upon the relative amounts of these materials in the mixtures and the amount of ammonia present in the system. Where the weight of water greatly exceeds the weight of sodium hydroxide, a large portion of sodium hydroxide is found in the upper layer. Thus, by proper regulation of the conditions of operation, it is possible to operate in a manner such that a substantial portion of the sodium hydroxide is distributed in the upper layer. This upper layer may be removed and after separation of the ammonia therefrom, a sodium hydroxide solution which contains substantially less silica than was present in the initial solution is thereby secured.

Since the solubility of certain impurities is at a minimum in a solution of sodium hydroxide having a concentration of 45–50 percent, it may often be desirable to concentrate the solution to this value prior to treatment with ammonia and thus remove a substantial amount of impurities, such as sodium carbonate, sodium chloride, etc., by precipitation. The purified solution may then be diluted or treated with ammonia and water in accordance with our invention to effect a removal of silica.

The amount of liquid ammonia required is dependent largely upon the concentration of the solution to be treated. For very dilute solutions, somewhat more ammonia is required in order to obtain a separation of liquid phases than for more concentrated solutions. In general, 0.5 to 7 parts of liquid ammonia per part of NaOH calculated upon the anhydrous basis is found to be suitable. Preferably, the total amount of ammonia in the system should exceed about 15 percent by weight.

While the temperature of operation may be varied considerably, so long as two liquid phases are separated, temperatures in excess of 35° C., preferably 50 to 70° C., appear to be suitable. The pressure may be adjusted to any convenient value which is sufficient to maintain the ammonia in liquid state. Pressures upward of 100 lbs. per sq. in. are suitable for this purpose.

Occasionally, it is found that the amount of caustic which is distributed in the lower silica-containing layer is undesirably large and that the yield of purified sodium hydroxide is undesirably low. However, the lower layer containing sodium hydroxide, in conjunction with additional ammonia, may be used to treat further amounts of sodium hydroxide solution. In such a case, no substantial quantity of sodium hydroxide is found to migrate from the solution into the lower layer and thus the yield of purified solution is correspondingly higher. Similarly, mixtures of sodium hydroxide, water and ammonia may be preliminarily made up and these mixtures may be used to treat silica-containing solutions of alkali metal hydroxide. In such cases, the initial presence of hydroxide in the ammonia tends to minimize the migration of a quantity of sodium hydroxide from the solution into the lower layer.

The lower layer containing the silica may be recycled for further treatment with ammonia in order to produce a further quantity of purified hydroxide. Thus, a continuous cyclic process may be established wherein caustic containing silica is treated to produce an upper ammonia layer of low silica content and a lower layer of higher silica content which lower layer may be recycled with or without additional caustic for further treatment. If the process is carried out continuously with continuous or periodic addition of further caustic to be purified, the silica in the lower caustic phase may tend to increase in content substantially. To prevent excessive accumulation of silica in the caustic being recycled, a portion of the caustic recovered in the lower layer may be discarded, if desired. However, it is found that some silica is precipitated in the presence of ammonia and thus it is possible to remove a portion of the silica from the caustic obtained from the lower caustic phase by precipitating silica and removing the precipitate by settling and/or filtration. The caustic may be diluted and additional ammonia added, if desired, in order to permit more complete removal of silica before recycling. Further details of the methods of precipitating silica from caustic may be found in our copending application Serial No. 325,788, filed March 25, 1940.

The lighter phase containing the major portion of the ammonia and the purified caustic contains a substantial quantity of water, the water concentration being in general, several times that of the caustic. Upon removal of ammonia, the solution is found to be dilute, being in general, below 20 to 30 percent in concentration.

The removal of the ammonia from such solutions is often difficult and expensive due to the large volume of liquid which must be distilled in order to secure complete recovery. In accordance with our invention, we have found that a substantial separation of sodium hydroxide from a liquor containing liquid ammonia, water and caustic may be secured by adding a further quantity of sodium hydroxide or a further quantity of ammonia thereto in order to cause a separation of two liquid phases, the heavier of which contains the major portion of sodium hydroxide, and the lighter of which contains the major portion of the ammonia. By adding sodium hydroxide or an aqueous sodium hydroxide having a concentration upward of about 50 percent to homogeneous solutions containing sodium hydroxide, water and ammonia, it is possible to obtain a separation of the described two liquid phases. In such a case, the resulting ammonia phase contains ammonia in concentration substantially higher than the ammonia concentration of the liquid undergoing treatment and the caustic phase contains most of the caustic which was in the initial solution. This process is particularly well adapted to treatment of homogeneous mixtures containing from 20 to 80 percent ammonia, 1 to 45 percent of NaOH and not more than about 80 percent water and which do not themselves tend to separate into two liquid layers.

In similar manner it is possible to secure a substantial separation of sodium hydroxide and ammonia from aqueous mixtures containing the same by adding ammonia in order to produce a separation of the two liquid phases or a mixture of ammonia, caustic and water containing more ammonia and/or caustic than the solution undergoing treatment may be used to produce the two liquid phases which may be separated.

Generally speaking, either caustic or ammonia or mixtures thereof with or without a small amount of water may be added to a homogeneous mixture of caustic, water and ammonia in order to adjust the composition of the mixture to produce a pair of liquid phases.

The range of compositions which separate into a pair of liquid phases varies in accordance with the temperature, being somewhat wider at higher temperatures than at lower temperatures. At a temperature of 60° C., mixtures containing the following concentrations of ammonia, water and caustic are found to separate into a pair of liquid phases.

| NaOH | 25% | 40% | 25% | 20% | 5% | 30% |
|---|---|---|---|---|---|---|
| $NH_3$ | 45 | 20 | 40 | 50 | 70 | 40 |
| $H_2O$ | 30 | 40 | 35 | 30 | 25 | 40 |

Thus, a mixture containing 8 percent sodium hydroxide, 33 percent water and 59 percent ammonia, such as may be derived by treatment of a 20 percent solution of sodium hydroxide with liquid ammonia may be mixed with an amount of a solution containing 75 percent NaOH and 25 percent water required to change the composition of the mixture to 27 percent NaOH, 43% $NH_3$ and 30% water and the mixture allowed to stratify at 60° C. In such a case, the lower layer contains over 85% of the NaOH in the initial solution in addition to the added sodium hydroxide and over 90 percent of the ammonia in the initial solution is in the upper phase.

Similarly, when a solution containing 35 percent sodium hydroxide, 15 percent ammonia and 50 percent water is mixed with sufficient liquid ammonia at 60° C. to change the total composition to 55 percent ammonia, 18 percent sodium hydroxide and 27 percent water, over 90 percent of the sodium hydroxide in the mixture is recovered in the lower layer and about two-thirds of the ammonia in the initial mixture is found in the upper phase in addition to that which was added to the mixture.

The treatment may be carried out countercurrently or in batches. We have found that a countercurrent extraction process such as is described in a copending application of Irving E. Muskat, Serial No. 179,334, filed December 11, 1937, may be used effectively in accordance with our invention. Thus, the process may be carried out in a column or tower in which ammonia or ammonia and water is introduced in the lower portion of the tower, sodium hydroxide introduced into an upper portion thereof and sodium hydroxide-ammonia-water mixtures withdrawn from the upper and lower portions of the tower. In order to increase the yield of hydroxide, it may be desirable to precipitate solid caustic in the tower while the liquid phases are in contact with each other. This may be done, for example, by cooling the uppermost portion of the tower, whereby solid sodium hydroxide or hydrates thereof is precipitated. This hydrate may be removed by any convenient method.

While the process is particularly adapted to the treatment of solutions of the alkali metal hydroxides, hydrates thereof may be treated in similar manner. Thus, solid hydrates or anhydrous caustic may be introduced into a body of ammonia and water and a portion of all of the solid melted in order to secure an upper ammonia phase containing sodium hydroxide substantially free from silica.

The yield of caustic in the upper layer may be controlled by controlling the amount of ammonia in the mixture. Within the range of ammonia concentration at which separation of liquid phases occur, the yield decreases with increasing ammonia concentration. In many cases, an excessive yield is not desirable since in such a case the caustic often contains more silica than is desired. Thus, in treating caustic solutions countercurrently it may be preferred to treat solutions containing 40 to 50 percent NaOH or above in order to prevent an excessive accumulation of caustic in the upper phase.

The purified caustic solution, after removal from the more impure lower phase, may be subjected to further purification, if desired. We have found that sodium hydroxide solutions of great purity may be secured by precipitating solid hydroxide therefrom by cooling or addition of ammonia or by other convenient process.

The following examples are illustrative:

Example I 1.1 parts by weight of anhydrous liquid ammonia were added to one part by weight of a 30 percent solution of sodium hydroxide containing 0.4 percent silica on the anhydrous basis. A pressure of 280 pounds per square inch and a temperature of 60° C. was maintained in the system and the mixture separated into two phases. The upper phase was withdrawn and after removal of ammonia, a 14 percent solution of sodium hydroxide containing only 0.05 percent silica calculated on the anhydrous basis was secured.

Example II 1.04 parts by weight of anhydrous liquid ammonia and 0.36 part by weight of water were added to one part by weight of a 50 percent solution of sodium hydroxide containing 0.4 percent silica on the anhydrous basis. The temperature was maintained at 60° C. and the pressure at 250 pounds per square inch. Upon removal of the upper layer and separation of ammonia therefrom, a 19.5 percent solution of sodium hydroxide containing 0.036 percent silica on the anhydrous basis was obtained.

The process may be used to treat either solutions or hydrates. These hydrates may be preliminarily melted or may be extracted with liquid ammonia, or ammonia-water mixtures and subsequently the resulting mixture may be allowed to separate into two liquid phases. This may be done in suitable manner by adjusting the composition of the system so that the concentration of ammonia is in excess of about 15 percent by weight, the concentration of water does not exceed about 45 percent by weight and the concentration of sodium hydroxide preferably does not substantially exceed that of the water in the system.

While the specification refers particularly to sodium hydroxide solutions, it is understood that other alkali metal hydroxide solutions such as solutions of potassium or lithium hydroxide may be purified in a similar manner.

Although the invention has been described with reference to the specific details of certain embodiments thereof, it is not intended that such details shall be regarded as limitations upon the scope of the invention except insofar as included in the accompanying claims.

We claim:

1. A process for purifying aqueous alkali metal hydroxide containing silica as an impurity which comprises contacting said solution with a material of the group consisting of liquid ammonia and mixtures of liquid ammonia and water in an amount sufficient to insure the separation of two liquid phases, the heavier of which contains a major portion of the silica, recovering the lighter of said phases, adding sodium hydroxide thereto to cause a separation of a second pair of liquid phases and separating the phases of said second pair.

2. A process for purifying aqueous alkali metal hydroxide containing silica as an impurity which comprises contacting said solution with a material of the group consisting of liquid ammonia and mixtures of liquid ammonia and water in an amount sufficient to insure the separation of two liquid phases, the heavier of which contains a major portion of the silica, recovering the lighter of said phases, adding sodium hydroxide thereto to cause a separation of a second pair of liquid phases, separating the phases of said second pair, recovering purified hydroxide from the heavier phase of said second pair and recycling the lighter phase of said second pair to treat a further quantity of impure alkali metal hydroxide.

3. The process of claim 2 wherein the alkali metal hydroxide is sodium hydroxide.

IRVING E. MUSKAT.
FRED D. AYRES.